United States Patent
Judell

(10) Patent No.: US 10,756,781 B2
(45) Date of Patent: Aug. 25, 2020

(54) CODE DIVISION MULTIACCESS (CDMA) COMMUNICATIONS SYSTEM AND METHOD WITH LOW PROBABILITY OF INTERCEPT, LOW PROBABILITY OF DETECT (LPI/LPD)

(71) Applicant: Foster-Miller, Inc., Waltham, MA (US)

(72) Inventor: Neil Judell, Cambridge, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 16/408,696

(22) Filed: May 10, 2019

(65) Prior Publication Data

US 2019/0349030 A1  Nov. 14, 2019

Related U.S. Application Data

(60) Provisional application No. 62/669,460, filed on May 10, 2018.

(51) Int. Cl.
*H04B 7/01* (2006.01)
*H04L 25/02* (2006.01)
(Continued)

(52) U.S. Cl.
CPC ............ *H04B 7/01* (2013.01); *H04J 13/0029* (2013.01); *H04L 5/0048* (2013.01);
(Continued)

(58) Field of Classification Search
None
See application file for complete search history.

(56) References Cited

U.S. PATENT DOCUMENTS

| 2005/0207384 A1* | 9/2005 | Quick, Jr. | H04B 1/7075 370/342 |
| 2006/0120471 A1* | 6/2006 | Learned | H04L 5/0021 375/260 |
| 2019/0068240 A1* | 2/2019 | Michaels | H04B 1/709 |

* cited by examiner

*Primary Examiner* — Jeffrey M Rutkowski
*Assistant Examiner* — Chae S Lee
(74) *Attorney, Agent, or Firm* — Iandiorio Teska & Coleman, LLP

(57) ABSTRACT

A code division multiaccess (CDMA) communications system with low probability of intercept, low probability of detect (LPI/LPD) includes at least one data dictionary stored on a storage device of a sender subsystem and a recipient subsystem. The at least one data dictionary includes at least one data predetermined start time and date, at least one data predetermined end time and date based on a mission length or a predetermined wrap time and date, a CDMA chip rate, and a complex zero-mean independent and identically distributed (iid) sequence where each complex number in the complex zero-mean iid sequence represents a CDMA chip stored on the storage device of the sender subsystem and the recipient subsystem. The system includes a tangible, non-transitory, machine-readable medium comprising machine-executable instructions which, when executed by at least one processor of a machine, cause the at least one processor to: receive a message, convert the message to symbols with corresponding phasors, determine a date and time to send the message, look up a data spreading vector for each corresponding phasor by providing a mutually agreed number of chips per phasor stored on the storage device of the sender subsystem and the recipient subsystem and by matching the date and time the message is to be sent to the at least one data predetermined start time and date and the at least one data predetermined end time and date. Each data spreading vector is multiplied by its corresponding phasor to create a data spread vector for each data spreading vector. The sender (Continued)

subsystem is configured to sequentially transmit each chip of each data spread vector as a signal.

21 Claims, 8 Drawing Sheets

(51) Int. Cl.
  *H04J 13/00* (2011.01)
  *H04L 25/03* (2006.01)
  *H04L 5/00* (2006.01)
(52) U.S. Cl.
  CPC ............ *H04L 25/022* (2013.01); *H04L 25/03* (2013.01); *H04L 2025/03789* (2013.01)

CODE DIVISION MULTIACCESS (CDMA) COMMUNICATIONS SYSTEM AND METHOD WITH LOW PROBABILITY OF INTERCEPT, LOW PROBABILITY OF DETECT (LPI/LPD)

RELATED APPLICATIONS

This application claims benefit of and priority to U.S. Provisional Application Ser. No. 62/669,460 filed May 10, 2018, under 35 U.S.C. §§ 119, 120, 363, 365, and 37 C.F.R. § 1.55 and § 1.78, which is incorporated herein by this reference.

FIELD OF THE INVENTION

This invention relates to a code division multiaccess (CDMA) communications system and method with low probability of intercept, low probability of detect (LPI/LPD).

BACKGROUND OF THE INVENTION

There are times when it may be desirable to communicate data from a transmitter to a receiver such that it is difficult or impossible for a third party to either intercept (receive and decode) or even detect that transmission. This is an area that has been worked on for several decades, in areas of modulation, detection, and interception.

One of the first approaches to clandestine communication was spread-spectrum transmission. Historically, two different approaches were used: code spreading (now widely used as code division multiple access—CDMA) and frequency hopping (FH). CDMA methods operate at relatively low power spectral density, while frequency hopping methods operate at narrow and high short-term power spectral density.

The narrow-and-high short-term power spectral densities for FH may make detection relatively easy, but the random hops over wide spacing make interception difficult.

The low power spectral density of CDMA may make these signals difficult to detect. GPS, for instance, typically operates at power spectral densities that are 10 to 20 dB below the noise floor. Describing how these signals work helps understand how this is possible and also can explain interception and detection means.

Modern modulators and demodulators work in what is called baseband methods. The original signal (RF or acoustic) is mixed down to DC using a quadrature heterodyne. In the receiver path, this technique multiplies the signal by cosine and sine of the center frequency of the signal. This may be an analog modulation or may be digital after high-speed A/D converter. The in-phase and quadrature components (corresponding to the cosine multiplication sine multiplication outputs) are combined to form complex numbers by multiplying the quadrature component by i, the square root of −1. The result is low-pass filtered, and typically decimated. On the transmit or sender side, the complex numbers are multiplied by the cosine and sine of the center frequencies, treated as if a complex number, and the real component selected. This is then output.

All modulation and demodulation operations are performed in the baseband complex signal. In a typical CDMA approach, a pseudo-noise (PN) sequence of +/−1 is selected. These sequences are usually selected from special polynomial-generated sequences that have desirable statistical properties. They tend to have Fourier transforms with broad, nearly flat response. They also tend to be nearly orthogonal to other PN sequences used permitting simultaneous use of the channel for multiple communicators. The individual +/−1 values are called "chips" and the number of chips per second tends to define the bandwidth of the system. For most systems, the chip rate in chips/sec is very close to the bandwidth in Hz. A very typical CDMA system will desire to transmit a series of bits. The modulation method is to take a full PN sequence, multiply it by 1 if we want to send a 1 bit, and multiply it by −1 if we want to send a 0 bit. In this case, the number of bits per second is equal to the number of chips per second divided by the number of chips in the PN sequence. Another scheme can combine two bits into one single PN sequence, by multiplying the sequence by:

$$\pm\sqrt{\frac{1}{2}} \pm \sqrt{\frac{-1}{2}}.$$

GPS satellites use a length 1023 Gold code (PN sequence) at 1.023 million chips/sec, for 1 code per mSec along with multiplying the sequence by +/−1 for data bits. One could, in theory, modulate 1K bits/sec on the channel, but in practice, only 50 bits/sec are modulated on the codes.

On the demodulation or recipient side of CDMA, the baseband received signal is correlated against the PN sequence used in transmission. This has the effect of coherent signal processing gain. By looking at the phase of the result of the correlation, the original data bit can be extracted. For GPS data communication, there are 1023 chips per sequence and 20 sequences per bit giving a coherent processing gain of $10 \log_{10} (1023*20)=43$ dB. For most communication systems, 4 dB of processed SNR is desirable, which means this system could, theoretically, operate 39 dB below the noise floor (43 dB process gain−4 dB required=39 dB). Because of this extremely low SNR it may be believed that it is extremely difficult to detect these signals if there was no access to the PN sequence for coherent processing gain. Unfortunately, this is not quite true.

In modern CDMA systems, such as cell phones and satellite communications, PN sequences of +/−1 are employed because they result in very low ratios of peak to average power. This is important in most systems because they tend to be power limited and chiefly limited by peak power. Furthermore, the signal consists of repeated copies of the PN sequence with each copy multiplied by a single value representing the communication bits. These structures permit exploitation of the signal by parties that may not have the PN sequence. If one takes the baseband signal, takes the magnitude squared of each sample, then takes the Fourier transform, then one discovers very sharp spikes in the spectrum at the chip rate frequency and some of its harmonics. This readily permits detection and determination of the chip rate by any observer. If one computes the autocorrelation function of a CDMA signal, computes the magnitude squared of each sample, then takes the Fourier transform, one discovers sharp spikes at the repetition rate of the PN sequence. This readily permits detection and determination of the PN sequence length. Such determination can be used to extract the original PN sequence thus permitting an interloper to correctly demodulate the data stream even if they were not originally in possession of the original PN sequence. In an electronic warfare system, the typical operation is to detect the presence of a CDMA signal via chip rate detection and then determine PN sequence period, determine PN sequence, and demodulate the communication signal.

One method to remove exploitability has been to employ extremely long PN sequences and apply data modulation to short segments of the PN sequence. The classified GPS P(Y) codes are an example, with a chip rate of 10.23 million chips per second and a PN sequence length of one week. The long PN sequence length makes it difficult to exploit autocorrelation to determine PN sequence. However, the strong statistics of the chip rate and some weak statistics on bit rate make detection easy and exploitation possible.

BRIEF SUMMARY OF THE INVENTION

The code division multiaccess (CDMA) communications system and method with low probability of intercept, low probability of detect (LPI/LPD) of one or more embodiments of this invention preferably removes virtually all known statistical characteristics of the modulated signal except for incoherent power detection. The CDMA communications system and method with LPI/LPD preferably begins with a series of dictionaries. Each dictionary may include a long sequence of independent, identically-distributed (iid) complex samples of a Gaussian random process. These can be taken from a long-repeat polynomial generator such that they are pseudo-random rather than truly random, or preferably, from measurements of an unrepeatable physical process, such as thermal noise from a resistor. In one example, associated with these dictionaries are absolute dates and times corresponding to each sample. This sets the "chip rate." Because the elements are Gaussian random variables, it not truly a chip rate, but the term is defined herein as a chip rate and is useful for this disclosure. The chip rate preferably sets the bandwidth. The length of the dictionary preferably sets the repeat time. Ideally, the repeat time will be days or weeks, although repeat time could be shorter or longer. For weak systems, shorter repetitions may be used. The dictionaries constitute a one-time pad encryption system.

In one aspect, a code division multiaccess (CDMA) communications system with low probability of intercept, low probability of detect (LPI/LPD) is featured. The system includes at least one data dictionary stored on a storage device of a sender subsystem and a recipient subsystem, the at least one data dictionary includes at least one data predetermined start time and date, at least one data predetermined end time and date based on a mission length or a predetermined wrap time and date, a CDMA chip rate, and a complex zero-mean independent and identically distributed (iid) sequence where each complex number in the complex zero-mean iid sequence represents a CDMA chip stored on the storage device of the sender subsystem and the recipient subsystem. The system includes a tangible, non-transitory, machine-readable medium comprising machine-executable instructions which, when executed by at least one processor of a machine, cause the at least one processor to: receive a message, convert the message to symbols with corresponding phasors, determine a date and time to send the message, look up a data spreading vector for each corresponding phasor by providing a mutually agreed number of chips per phasor stored on the storage device of the sender subsystem and the recipient subsystem and by matching the date and time the message is to be sent to the at least one data predetermined start time and date and the at least one data predetermined end time and date. Each data spreading vector is multiplied by its corresponding phasor to create a data spread vector for each data spreading vector. The sender subsystem is configured to sequentially transmit each chip of each data spread vector as a signal.

In one embodiment, the at least one data dictionary includes at least one Gaussian data dictionary. The system may include a Gaussian pilot dictionary stored on the storage device of the sender subsystem and the recipient subsystem. The at least one pilot dictionary includes at least one pilot predetermined start time and date and at least one pilot predetermined end time and date based on a mission length or a predetermined wrap time and date, a CDMA chip rate, and a Gaussian complex zero-mean iid sequence where each complex number in the complex zero-mean iid sequence represents a CDMA chip stored on the storage device of the sender subsystem and the recipient subsystem. The at least one processor may be further configured to look up a pilot spreading vector for each corresponding phasor by providing a mutually agreed number of chips per phasor stored on the storage device of the sender subsystem and the recipient subsystem and match the date and time the message is to be sent to the at least one pilot predetermined start date and time and the at least one predetermined pilot end time and date to create a pilot spread vector for each pilot spreading vector. Each data spread data vector and each pilot spread vector may be combined. The sender subsystem may be configured to transmit each chip of the combined data spread vector and the pilot spread pilot vector as a signal. The system may further include a linear time invariant invertible filter coupled to the sender subsystem configured to shape the spectrum of the transmitted signal to match the spectrum shape of a noise environment. The system may further include a filter coupled to the recipient subsystem configured to invert the shape output by the linear time invariant invertible filter. The recipient subsystem may be configured to receive the signal from the sender subsystem and includes the mutually agreed number of chip sets per phasor and the data dictionary, the at least one processor may be further configured to generate an optimum multi-doppler correlation receiver. The recipient subsystem may be configured to receive the signal from the sender subsystem and includes the mutually agreed number of chip sets per phasor, the data dictionary, and the pilot dictionary, the processor may be further configured to generate an optimum multi-doppler correlation receiver.

In another aspect, a method for code division multiaccess (CDMA) communications with low probability of intercept, low probability of detect (LPI/LPD) is featured. The method includes storing at least one data dictionary including at least one data predetermined start time and date and at least one data predetermined end time and date based on a mission length or a predetermined wrap time and date, a CDMA chip rate, and a complex zero-mean independent and identically distributed (iid) sequence where each complex number in the complex zero-mean iid sequence represents a CDMA chip stored on a sender subsystem and a recipient subsystem. A message is received. The message is converted to symbols with corresponding phasors. A date and time to send the message is determined. A data spreading vector for each corresponding phasor is looked up or selected by providing a mutually agreed number of chips per phasor stored on the sender subsystem and the recipient subsystem and by matching the date and time of the message is to be sent to the at least one data predetermined start time and date and the at least one data predetermined end time and date. Each data spreading vector is multiplied by its corresponding phasor to create a data spread data vector for each data spreading vector. Each chip of each data spread vector is transmitted as a signal.

In one embodiment, the data dictionary may include at least one Gaussian data dictionary. The method may further include providing at least one Gaussian pilot dictionary including at least one pilot predetermined start time and date and at least one pilot predetermined end time and date based on a mission length or a predetermined wrap time and date, a complex zero-mean iid sequence where each complex number and the complex zero-mean iid sequence represents a CDMA chip stored on the sender subsystem and the recipient subsystem. The method may include looking up a pilot spreading vector for each corresponding phasor by providing a mutually agreed number of chips per phasor stored on the sender subsystem and the recipient subsystem and by matching the date and time the message is to be sent to the at least one pilot predetermined start time and date and the at least one pilot predetermined end time and date. The method may include creating a pilot spread vector for each pilot spreading vector. The method may include combining each data spread vector and each pilot spread vector. The method may include transmitting each chip of the combined data spread vector and pilot spread vector as a signal. The method may include providing a linear time invariant invertible filter coupled to the sender subsystem configured to shape the spectrum of the transmitted signal to match the spectrum shape of a noise environment. The method may include inverting the shape output by the linear time invariant invertible filter. The method may include receiving the signal from the sender subsystem, providing the mutually agreed number of chip sets per phasor and the data dictionary and generating an optimum multi-doppler correlation receiver. The method may include receiving the signal from the sender subsystem, providing the mutually agreed number of chip sets per phasor, the data dictionary, and the pilot dictionary and generating an optimum multi-doppler correlation receiver. The method may include receiving the signal from the sender subsystem, providing the mutually agreed number of chip sets per phasor, the data dictionary, and the pilot dictionary and generating an optimum multi-doppler correlation receiver.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
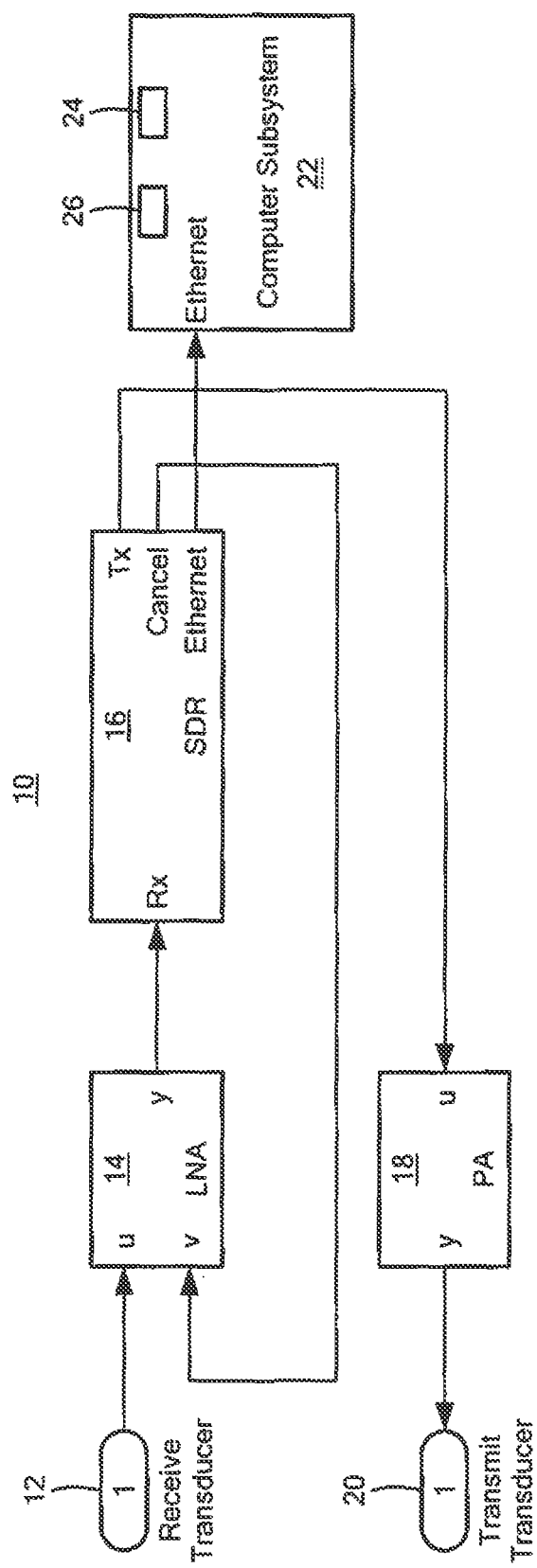
FIG. 1 is a schematic block diagram showing the primary components of one embodiment of the CDMA Communications System and Method with LPI/LPD of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of CDMA communications system 10 with LPI/LPD. System 10 preferably includes receive transducer 12, low noise amplifier 14, software defined radio (SDR) subsystem 16, power amplifier 18, transmit transducer 20, and computer subsystem 22. Computer subsystem 22 preferably includes one or more processors, e.g., processor 24 and storage device 26, e.g., a memory or similar type storage device.

Any combination of computer-readable media or memory may be utilized for storage device 26. The computer-readable media or memory may be a computer-readable signal medium or a computer-readable storage medium. The computer-readable storage medium or memory may be an electronic, magnetic, optical, electromagnetic, infrared, or semiconductor system, apparatus, or device, or any suitable combination of the foregoing. Other examples may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. As disclosed herein, the computer-readable storage medium or memory may be any tangible, non-transitory, machine readable medium that may contain, or store one or more programs for use by or in connection with one or more processors 24 on a device such as a computer subsystem 22, e.g., a personal computer, a tablet, a cell phone, a smart device, or similar type computing device.

Computer program code for the one or more programs for carrying out the instructions or operation of one or more embodiments of this invention may be written in any combination of one or more programming languages, including a high-level mathematics modeling language like Matlab, an object oriented programming language, e.g., C++, Smalltalk, Java, and the like, and conventional procedural programming languages, such as the "C" programming language or similar programming languages.

One of more embodiments of this invention are disclosed below with reference to flowchart illustrations and/or block diagrams of systems and methods. Each block of the flowchart illustrations and/or block diagrams, and combinations thereof may be implemented by computer program instructions. These computer program instructions may be provided to a processor of a general purpose computer, special purpose computer, or other programmable data processing apparatus to produce a machine, such that the instructions, which execute by processor 24 of the computer subsystem 22 or other programmable data processing apparatus, create means for implementing the functions/acts specified in the flowchart and/or block diagram block or blocks.

Processor 24 may include one or more processors, an application-specific integrated circuit (ASIC), firmware, hardware, and/or software (including firmware, resident software, micro-code, and the like) or a combination of both hardware and software that may all generally be referred to herein as "processor", which may be part of system 10 and method thereof of this invention.

Figure 2:
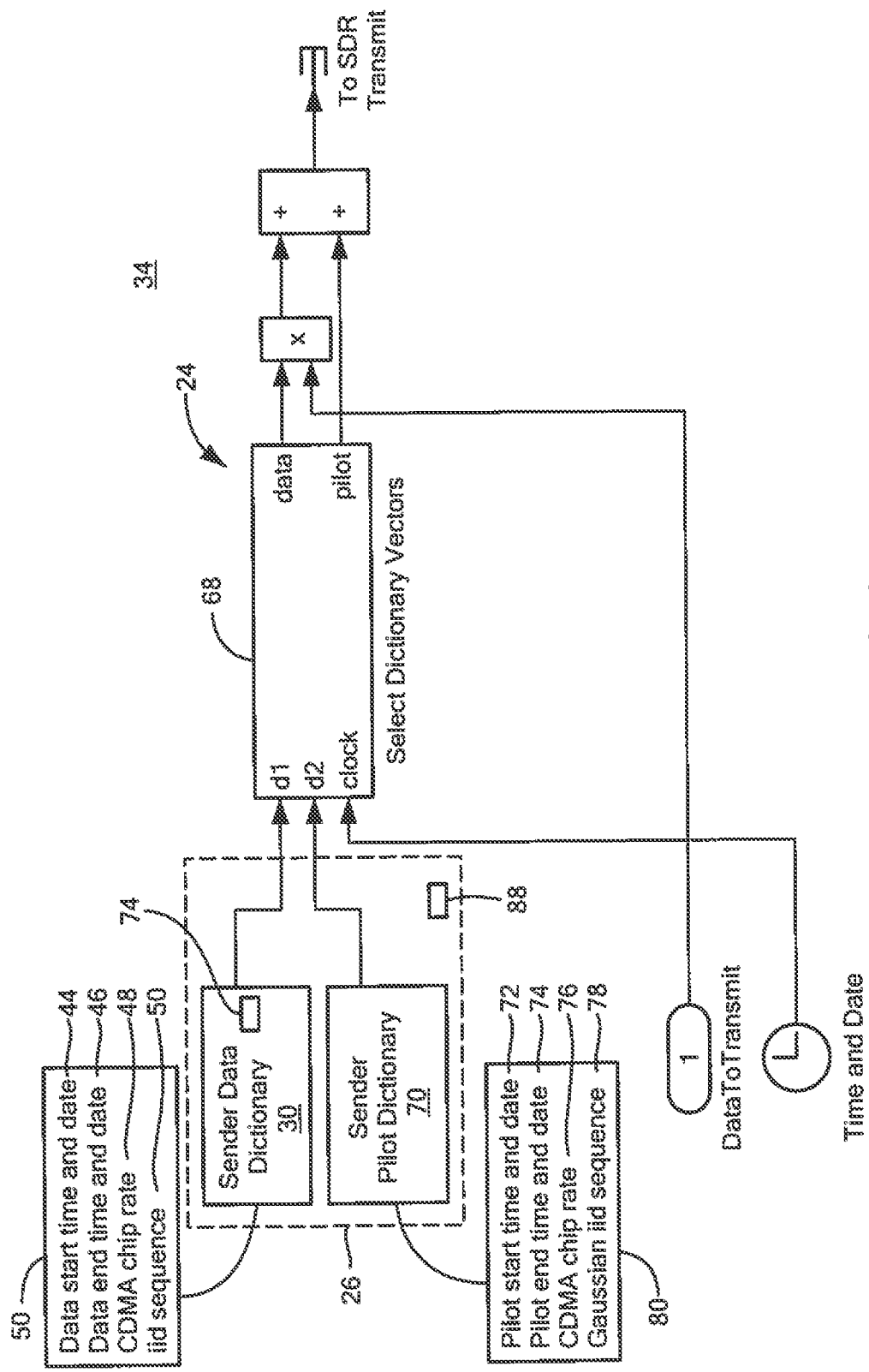
FIG. 2 is a schematic block diagram showing one example of the primary components of a sender subsystem of the system shown in FIG. 1.
Figure 3:
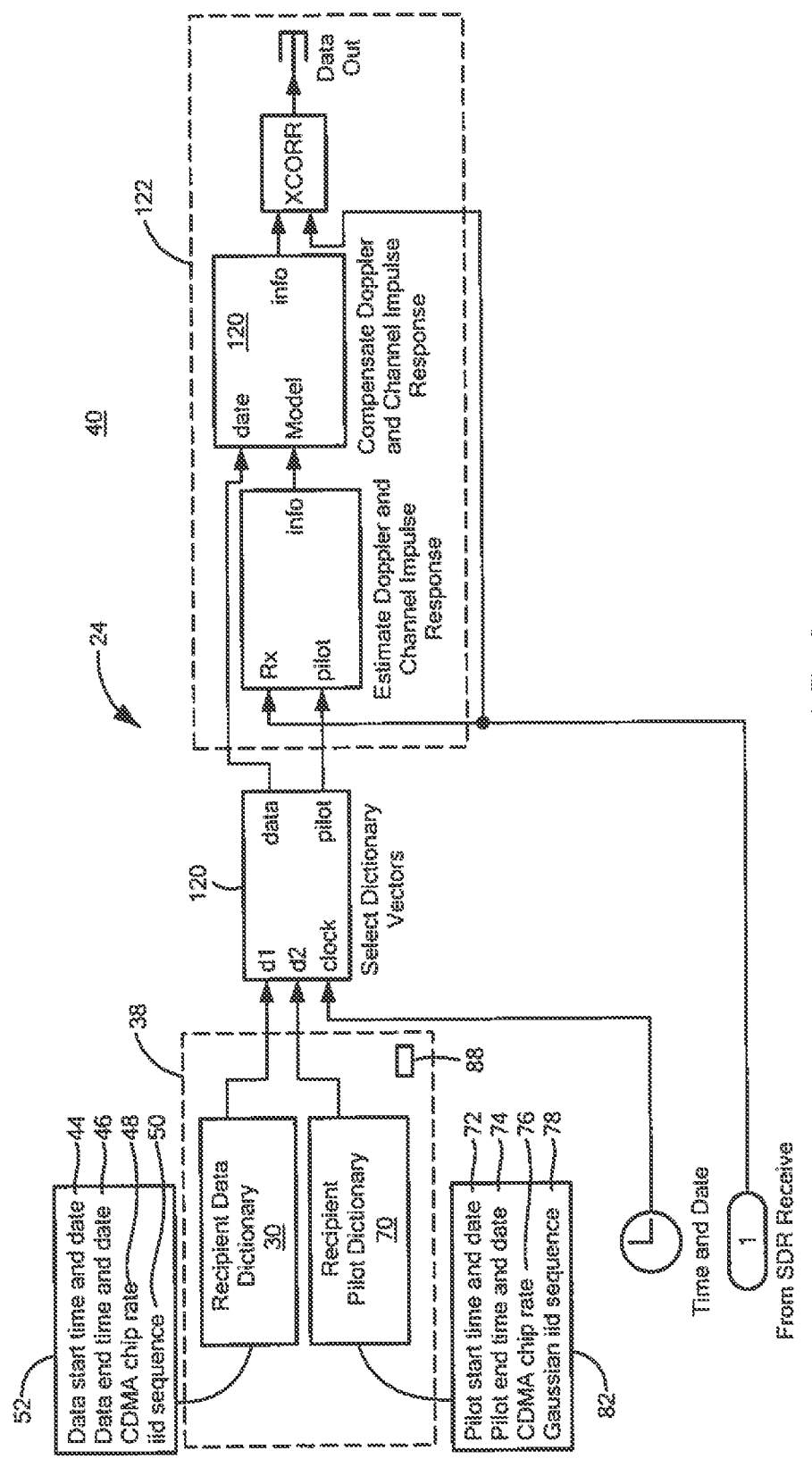
FIG. 3 is a schematic block diagram showing one example of the primary components of a recipient subsystem which receives a transmission signal from the sender subsystem shown in FIGS. 1-2.

System 10 also includes at least one data dictionary 30, FIG. 2, stored on storage device 26 of sender subsystem 34 and stored on storage device 38, FIG. 3, of recipient subsystem 40. Each of at least one data dictionary 30, FIGS. 2 and 3, includes at least one data predetermined start time and date 44, at least one data predetermined end time and date 46 based on a mission length or predetermined wrap time, CDMA chip rate 48, and complex zero-mean independent and identically distributed (iid) sequence 50 where each complex number in complex zero-mean iid sequence 50 represents a CDMA chip stored on storage device 26 of sender subsystem 34 and storage device 38 of recipient subsystem 40 as shown in captions 50 and 52, respectively.

Figure 4:
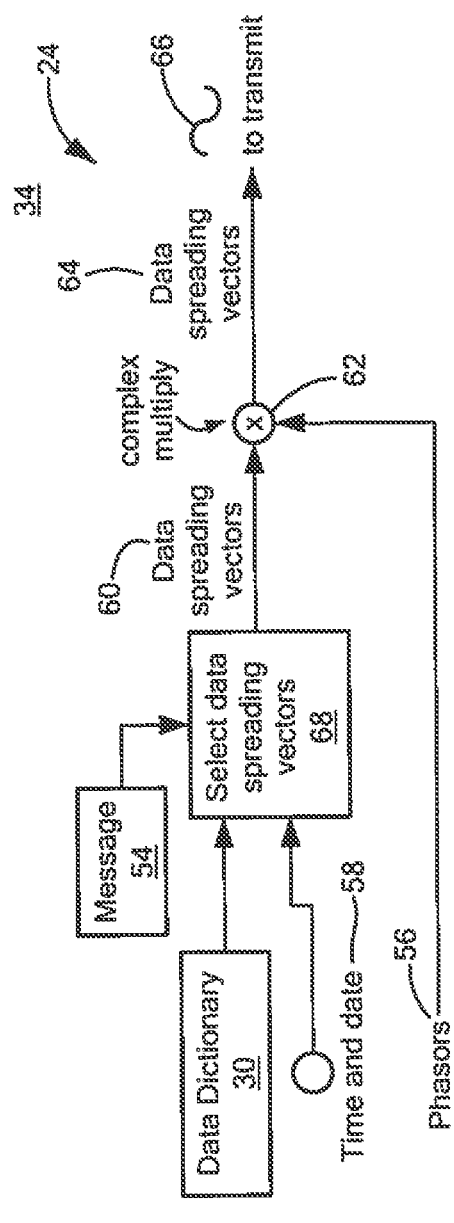
FIG. 4 is a schematic block diagram showing in further detail one example of the sender subsystem shown in FIGS. 1-2.

System 10 also includes tangible, non-transitory, machine-readable medium 26, FIGS. 1 and 2, discussed above, comprising machine executable instructions which when executed by at least one processor 24 cause at least one processor 24 to receive message, e.g., message 54, FIG. 4, where like parts have been given like numbers. Processor 24 then converts message 54 to symbols with corresponding phasors 56 and determines date and time 58 to send message 54 to recipient subsystem 40, FIG. 3. Processor 24 then looks up or selects data spreading vectors 60 for each corresponding phasors 56, indicated at 68, by providing mutually agreed number of chips per phasor 88, FIGS. 2 and 3, stored on storage device 26 of sender subsystem 34 and storage device 38 of recipient subsystem 40 and by matching the date and time 58 message 54 is to be sent to recipient subsystem 40 to at least one data predetermined start time 44, FIGS. 2 and 3, and the at least one data predetermined end time 46.

Processor 24 then multiplies (complex multiplies) each of selected data spreading vectors 60, FIG. 4, by its corresponding phasor 56, indicated at 62, to create data spread vectors 64 for each data spreading vector 60. Thus, each of data spread vectors 64 is equal to its data spreading vector times its corresponding phasor. Sender subsystem 34, FIGS. 1 and 2, then sequentially transmits each chip of each data spread vector of data spread vectors 64 as a signal, e.g., signal 66.

In one design, at least one data dictionary 30, FIGS. 2, 3 and 4, is preferably a Gaussian data dictionary. In this example, sender subsystem 34 and recipient subsystem 40 each preferably include Gaussian pilot dictionary 70 preferably stored on storage device 26 of sender subsystem 34 and storage device 38 of recipient subsystem 40. Pilot dictionary 70 preferably includes at least one pilot predetermined start time and date 72, FIGS. 2 and 3, at least one predetermined pilot end time and date 74 based on a mission length or predetermined wrap time, CDMA chip rate 76, and Gaussian complex zero-mean iid sequence 78 shown in captions 80 and 82, respectively, where each complex number in complex zero-mean iid sequence 78 represents a CDMI chip stored on storage device 26 of sender subsystem 34, FIG. 2, and storage device 38, FIG. 3, of recipient subsystem 40.

Figure 5:
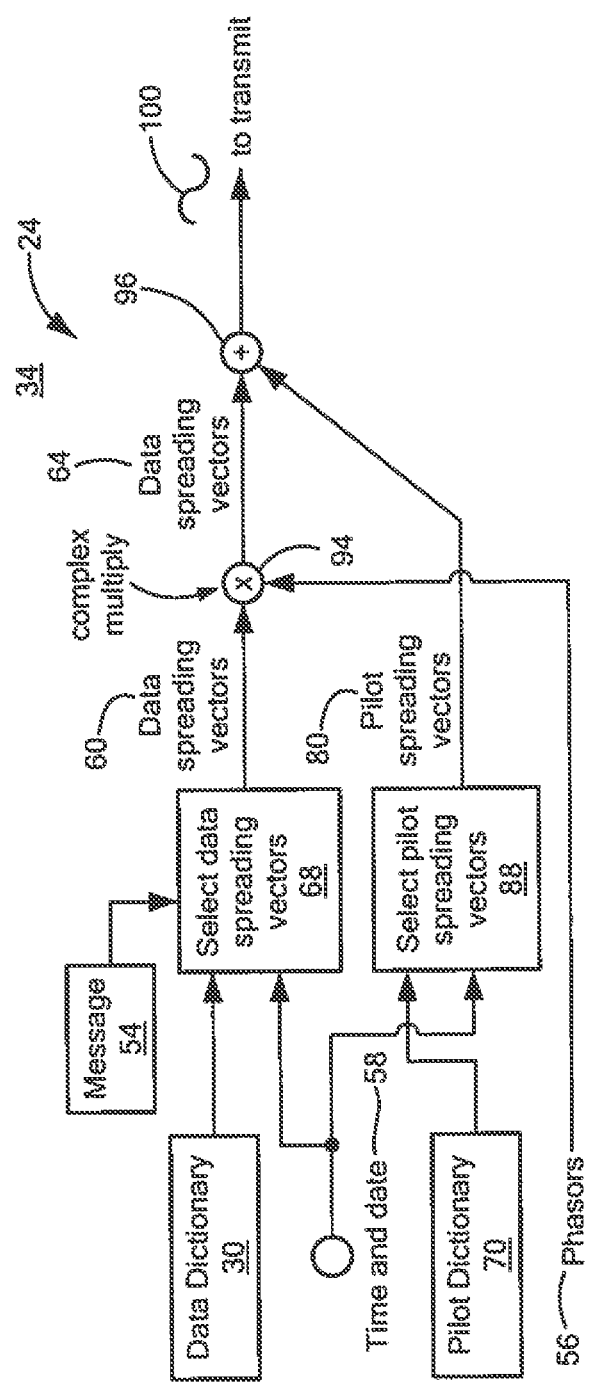
FIG. 5 is a schematic block diagram showing in further detail one example of sender subsystem shown in one or more of FIGS. 1, 2 and 4 including both a data dictionary and a pilot dictionary.

In this example, at least one processor 24 looks up or selects pilot spreading vectors 80, FIG. 5, where like parts have been given like numbers, indicated at 88, for each corresponding phasor 56 by providing mutually agreed upon number of chips per phasor 88, FIGS. 2 and 3, stored on storage device 26 of sender subsystem 34 and storage device 38 of recipient subsystem 40. Processor 24 then matches the data and time 58 message 54 is to be sent to the at least one pilot predetermined start time and date 72, FIGS. 2 and 3, and the at least one predetermined pilot end time and date 74 and creates pilot spreading vectors 80, FIG. 5, and pilot spread vectors 82 for each of pilot spreading vectors 80. Thus, each of pilot spread vectors 82 is a copy of its corresponding spreading vector 80. Processor 24 then combines each of data spread vectors 64 and pilot spread vectors 82, indicated at 96. Sender subsystem 34 of system 10, FIGS. 1 and 2, then sequentially transmits each chip of the combined data spread vectors 64 and pilot spread vectors as a signal, e.g., signal 100.

Figure 6:
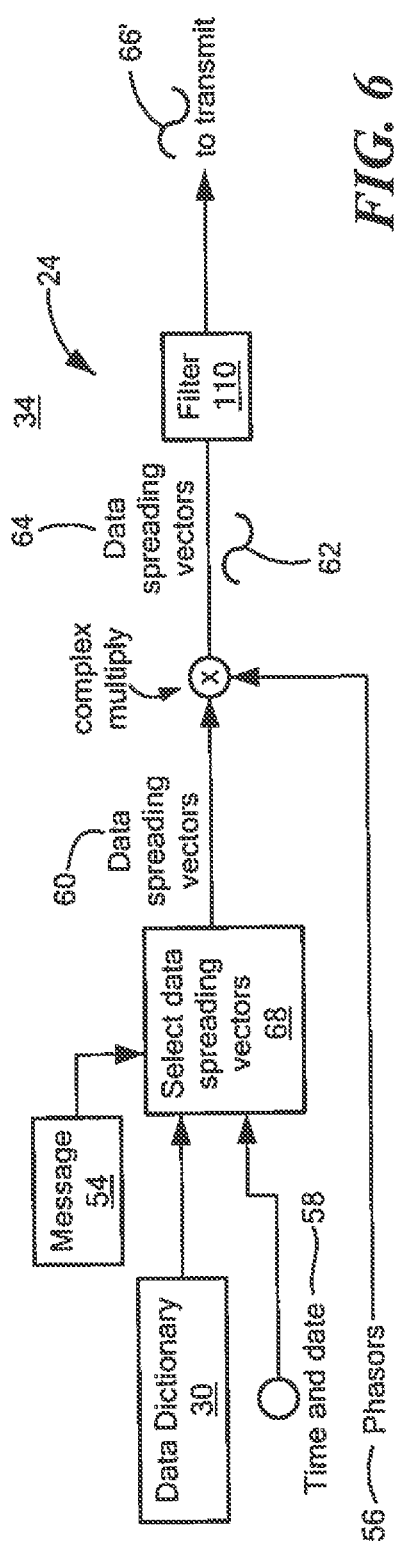
FIG. 6 is a schematic block diagram showing an example of a linear time invariant invertible filter coupled to the sender subsystem shown in FIG. 4.
Figure 7:
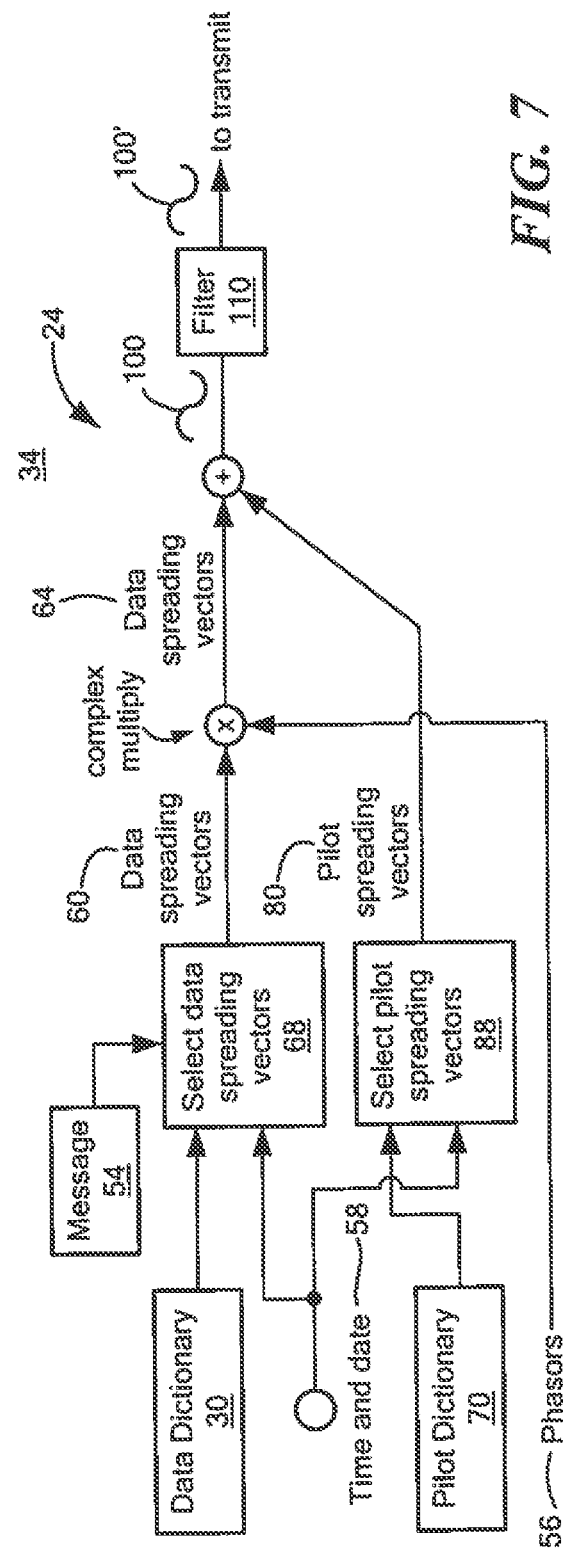
FIG. 7 is a schematic block diagram showing an example of a linear time invariant invertible filter coupled to the sender subsystem shown in FIG. 5.

In one example, system 10, shown in one or more of FIGS. 1-5, preferably includes linear time invariant invertible filter 110, FIG. 6, where like parts have been given like numbers, coupled to sender subsystem 34 as shown. Linear time invariant invertible filter 110 is preferably configured to shape the spectrum of signal 62, FIGS. 4 and 6, and output signal 62' which preferably matches the spectrum of a noise environment. Similarly, system 10, shown in one or more of FIGS. 1-6 may include linear time invariant invertible filter 110, FIG. 7, coupled to sender subsystem 34 configured to shape the spectrum of transmitted signal 100, FIGS. 5 and 7, and output signal 100' which preferably matches the spectrum shape of a noise environment. In one example, recipient subsystem 40, FIG. 3, may include filter 252, FIGS. 8 and 9, configured to invert the shape of signal 66' and 100' output by linear time invariant invertible filter 110, FIGS. 6 and 7.

Figure 8:
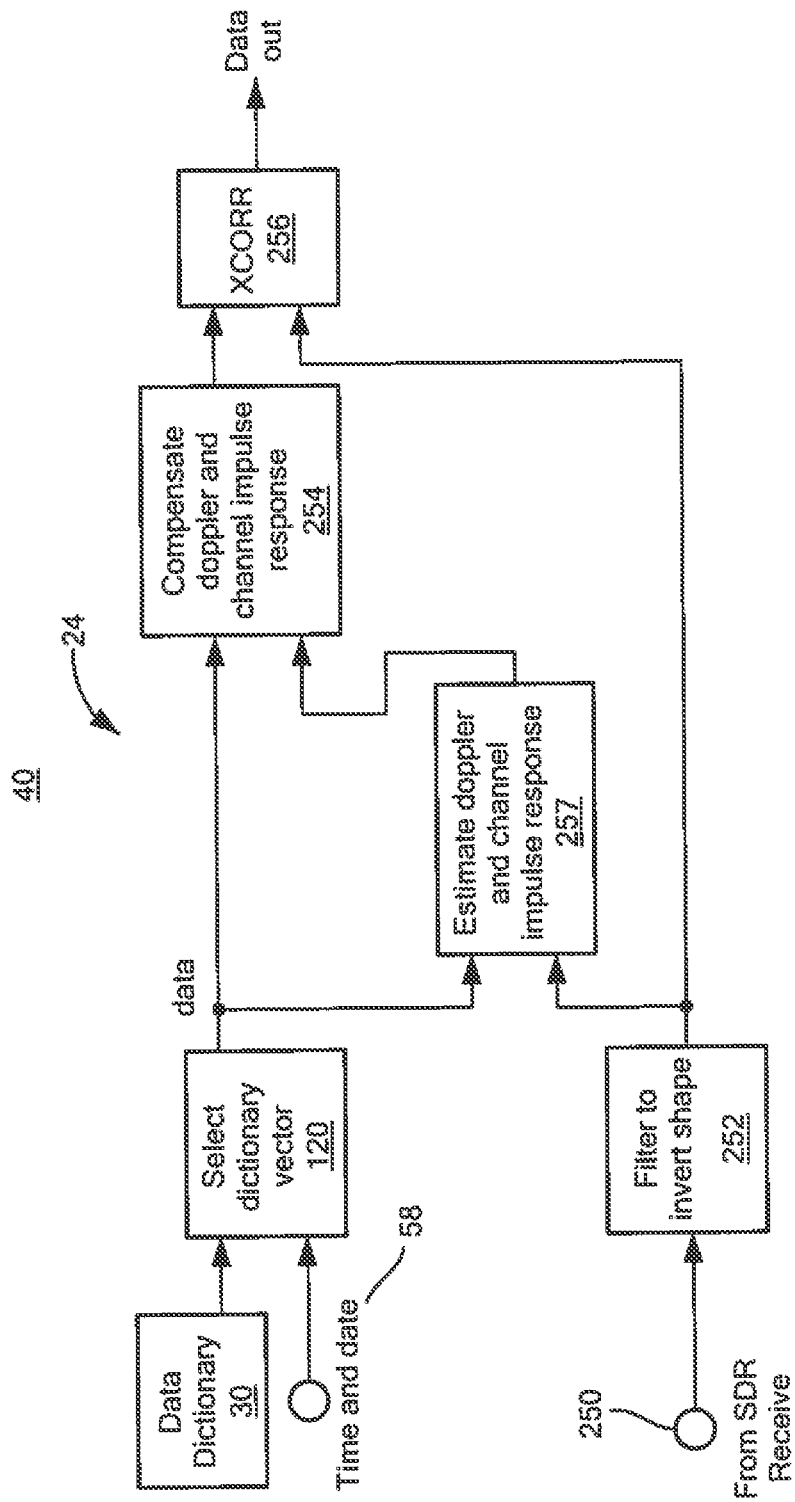
FIG. 8 is a schematic block diagram showing an example of a filter coupled to the recipient subsystem shown in FIG. 3 configured to invert the shape output by the linear time invariant invertible filter shown in FIG. 6.

In one design, recipient subsystem 40, FIGS. 3 and 8 and may be configured to receive signal 66, 66', 100, and/or 100' output by sender subsystem 34 shown in one or more of FIGS. 1-7. Recipient subsystem 40, FIG. 3, preferably includes mutually agreed number of chips per phasor 88. FIG. 3, and data dictionary 30. In this example, processor 24 is preferably configured to generate optimum multi-doppler correlation receiver 122, FIGS. 3 and 8, in recipient subsystem 40 that preferably estimates doppler channel and channel response 254, compensates doppler and channel impulse response 256, and performs cross-correlation (XCORR) 258.

Figure 9:
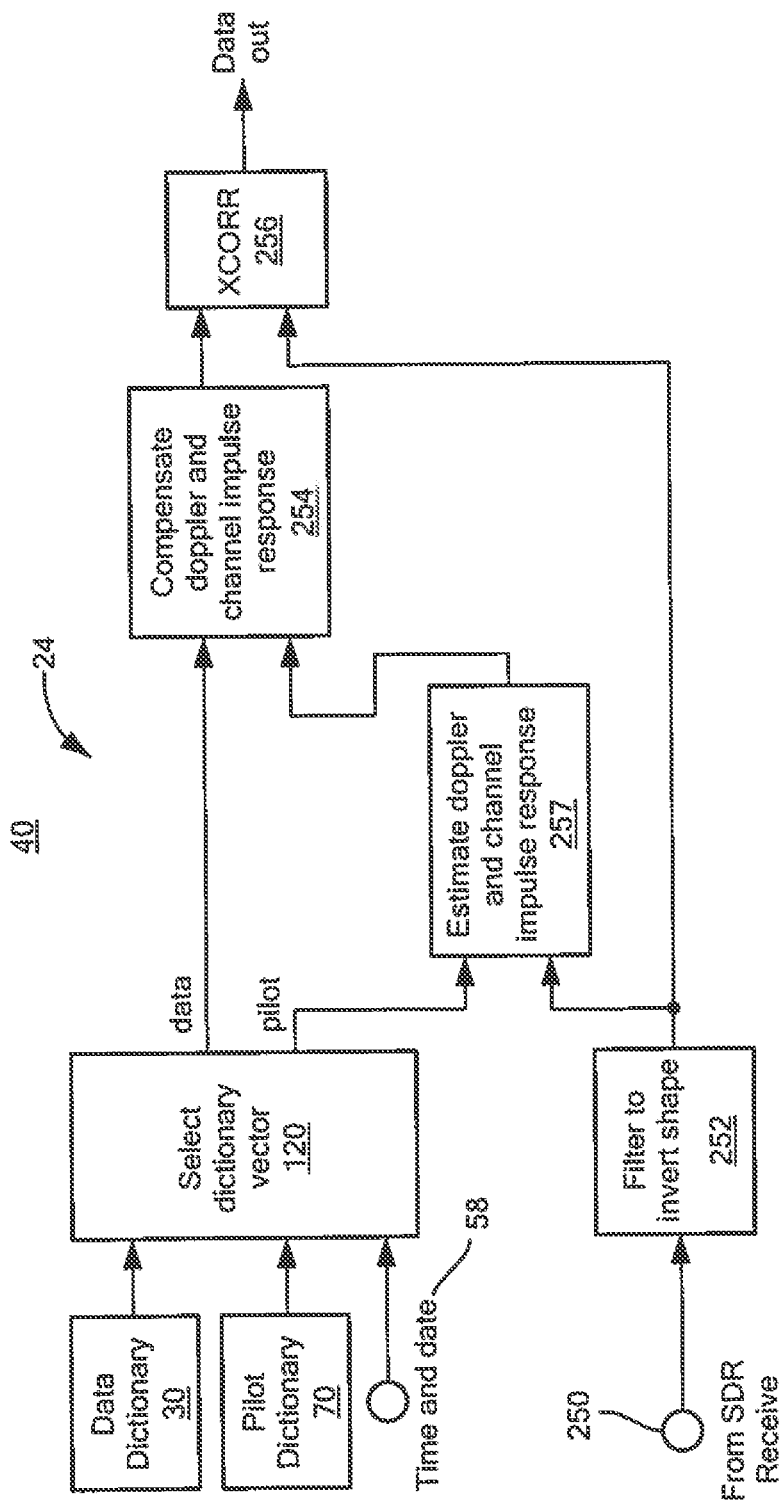
FIG. 9 is a schematic block diagram showing an example of a filter coupled to the recipient subsystem shown in FIG. 3 configured to invert the shape output by the linear time invariant invertible filter shown in FIG. 7.

In another design, recipient subsystem 40, FIGS. 3 and 9 may be configured to receive signal 66, 66', 100, and/or 100' output by sender subsystem 34 shown in one or more of FIGS. 1-7. Recipient subsystem 40, FIG. 3, preferably includes mutually agreed number of chips per phasor 88, data dictionary 30 and pilot dictionary 70. In this example, processor 24 is preferably configured to generate optimum multi-doppler correlation receiver 122 in recipient subsystem 40, FIGS. 3 and 9 that preferably estimates doppler channel and channel response 254, compensates doppler and channel impulse response 256, and performs cross-correlation (XCORR) 258.

Figure 10:
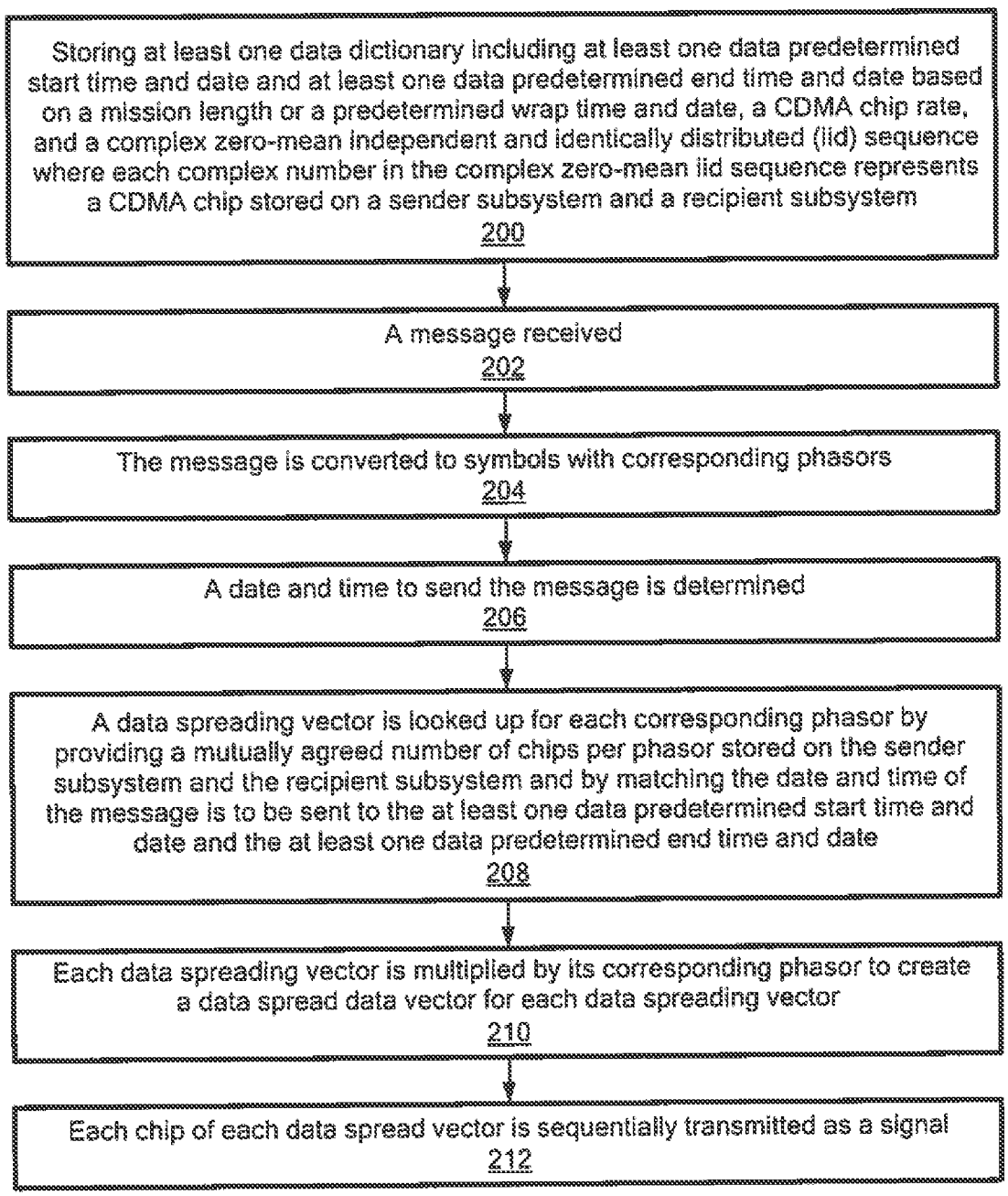
FIG. 10 is a schematic block diagram showing one example of the primary steps of one example of the method of CDMA communications with LPI/LPD of this invention.

One example of the method of CDMA communications with LPI/LPD includes storing at least one data dictionary including at least one data predetermined start time and date and at least one data predetermined end time and date based on a mission length or a predetermined wrap time and date, a CDMA chip rate, and a complex zero-mean independently and identically distributed (iid) sequence where each complex number and the zero means sequence represents a CDMA chip stored on a sender subsystem and a recipient subsystem, step 200, FIG. 10. A message is received, step 202. The message is converted to symbols with corresponding phasors, step 204. A date and time to send the message is determined, step 206. A data spreading vector is looked up or selected for each corresponding phasor by providing a mutually agreed number of chips per phasor stored on the sender subsystem in the recipient subsystem by matching the date and time the message is to be sent to the at least one predetermined start time and date and the at least one data predetermined end time and date, step 208. Each spreading vector is multiplied by its corresponding phasor to create a spread data vector for each spreading vector, step 210. Each chip of each spread vector is sequentially transmitted as a signal, step 212.

In one embodiment, the data dictionary may include at least one Gaussian data dictionary. The method may further include providing at least one Gaussian pilot dictionary including at least one pilot predetermined start time and date and at least one pilot predetermined end time and date based on a mission length or a predetermined wrap time and date, a complex zero-mean iid sequence where each complex number and the complex zero-mean iid sequence represents a CDMA chip stored on the sender subsystem and the recipient subsystem. The method may include looking up a pilot spreading vector for each corresponding phasor by providing a mutually agreed number of chips per phasor stored on the sender subsystem and the recipient subsystem and by matching the date and time the message is to be sent to the at least one pilot predetermined start time and date and the at least one pilot predetermined end time and date. The method may include creating a pilot spread vector for each pilot spreading vector. The method may include combining each data spread vector and each pilot spread vector. The method may include transmitting each chip of the combined data spread vector and pilot spread vector as a signal. The method may include providing a linear time invariant invertible filter coupled to the sender subsystem configured to shape the spectrum of the transmitted signal to match the spectrum shape of a noise environment. The method may include inverting the shape output by the linear time invariant invertible filter. The method may include receiving the signal from the sender subsystem, providing the mutually agreed number of chip sets per phasor and the data dictionary and generating an optimum multi-doppler correlation receiver. The method may include receiving the signal from the sender subsystem, providing the mutually agreed number of chip sets per phasor, the data dictionary, and the pilot dictionary and generating an optimum multi-doppler correlation receiver. The method may include receiving the signal from the sender subsystem, providing the mutually agreed number of chip sets per phasor, the data dictionary, and the pilot dictionary and generating an optimum multi-doppler correlation receiver.

In one example, a symbol rate, based on a fixed number of chips is preferably selected. To modulate the signal, the chips from data dictionary 30, shown in one or more of FIGS. 1-7 are obtained corresponding to the present date and time and multiplies the correct number of chips by a phasor (a unity-magnitude complex number) corresponding to the communication bit(s).

For example, a white noise sequence corresponding to 20,000 chips per second is obtained. In one example, a quadrature phase shift keying (QPSK) at one symbol per 1024 chips may be utilized. At the start, assume right now corresponds to the start of the dictionary. The technique takes the first 1024 elements, multiplies them all by $$\pm\sqrt{\frac{1}{2}} \pm \sqrt{\frac{-1}{2}},$$

depending on the two data bits, and sends those out. Next for two data bits, take the second 1024 elements of the dictionary, and multiply those by the phasor for the next two data bits, and so on. Alternatively, a binary phase shift keying (BPSK) could be used, and one bit per symbol, so we multiply the dictionary segments by +/−1. The greater the number of bits per symbol, the larger the SNR after coherent processing that we need. For BPSK, we need 4 dB SNR, for QPSK, we need 7 dB. In the BPSK case, we obtain 20 bits/second, and in the QPSK case, we obtain 40 bits/second.

The feature here is that multiplying sections of a white noise signal by phasors introduces no measurable changes into the statistics of the signal. The result is still an iid Gaussian-distributed random variable. No statistical test can be used to ascertain characteristics of the signal.

This means that an interloper not in possession of the dictionary cannot detect the signal except by incoherent power measurement, the weakest form of detection possible. For a BPSK system with 1024 chips per symbol, needing 4 dB coherent SNR means that the system can operate at 10 $\log_{11}(1024)-4=26$ dB below the noise floor. If the signal is in stationary white noise, as it is likely to be in RF, then detection is governed by chi-squared statistics. If the signal is in chaotic noise, as it is likely to be in undersea acoustics, then detection is essentially impossible for signals more than 6 dB below noise floor.

Demodulation of the signal relies on the recipient subsystem 40 knowing correct time, rough distance to transmitter, and having the transmitter dictionary. For most applications, the operators of the nodes of the communication system will have approximate knowledge of expected locations of operation prior to deployment. The less is known about the distance between the systems, the larger the number of dictionary elements that must be searched to match the received signal. The number of dictionary elements searched is proportional to the distance knowledge uncertainty.

The received signal, e.g., signal 66, 66', 100, and/or 100' output by sender subsystem 34 shown in one or more of FIGS. 1-9 is correlated against the known section of the dictionary corresponding to the bit sequence. The phase of the correlation is measured to determine the data bit. Normally, distances are not precisely known, so a search over sections of the dictionary may be necessary to establish synchronization. Additionally, as the correlation length increases, the sensitivity to Doppler shift increases, so a search of Doppler shifts may be needed. Time of correlation peak along with knowledge of propagation speed can be used to determine precise range between transmitter and receiver, a side benefit.

For RF channels, this approach can be effectively utilized. For underwater acoustics, this approach may have some challenges. In underwater communication, there are typically many different paths of varying lengths in the acoustics between the transmitter and the receiver—a phenomenon called multipath. This tends to be far worse for underwater acoustics than for RF and requires mitigation methods. Furthermore, the underwater propagation path tends to be rapidly time-varying, with coherence times that may be only a few symbols long. In those cases, it may be appropriate to add a pilot signal to the transmitter. To add a pilot signal, a second dictionary is employed as a pilot 3 dictionary, e.g., pilot dictionary 70, discussed above with reference to one or more of FIGS. 1-10. Pilot dictionary 70 may be left without data modulation, multiplied by a constant, and added to the data-modulated data dictionary 30 signal. The result signal is a combination of an iid zero-mean Gaussian signal with another iid zero-mean Gaussian signal. The result is an iid zero-mean Gaussian signal. Adding the pilot signal has done nothing to alter the statistics of the resulting transmitted signal, other than by simply increasing the transmitted power. Depending on the channel characteristics, the pilot signal may be at a significantly lower power than the original data signal.

On the recipient side, e.g., recipient subsystem 40, FIGS. 3, 8, and 9, the pilot signal and data signal are nearly orthogonal. This means that a detector for the pilot signal can be constructed without interference from the data signal. Furthermore, because there is no data modulation, the correlation receiver for the pilot signal can be constructed of much longer segments than the data correlator, resulting in high coherent processing gain. The detector for the pilot signal can be used to estimate the transfer function of the channel. Because the pilot signal and the data signal are time-coincident and occupy the exact same spectrum, the channel transfer estimate generated by the pilot detector can be applied to the data channel to mitigate the effects of multipath. System 10 and the method thereof shown in one or more of FIGS. 1-10, may be constructed for underwater acoustic communication at 110 kHz center frequency, using equal power between pilot and data dictionaries 30, using QPSK and 20,000 chips/second.

In one example, the signals are preferably 10-20 dB below the noise floor. Signal cancellation techniques are preferably applied to permit full-duplex operation of system 10. While full-duplex communication using cancellation is highly advantageous for system 10 and the method thereof with LPI/LPD, it may not be essential.

In one example, system 10 and the method thereof preferably included two nodes. Each node preferably includes its electronics on a boat, and a cable running to a pair of ceramic transducers under the surface of the water. The transducers are preferably 110 KHz center frequency. As shown in FIG. 1, transducer 12 is preferably wired to the input of a low-noise amplifier 14 with an input summing junction. The summing junction was used for analog cancellation of the direct path from the transmitting transducer. Transmitting transducer 20 is preferably wired to power amplifier 18. A pair of Ettus software-defined radios (SDRs) 16 preferably perform up-conversion and down-conversion. Control is preferably via Ethernet. Control, modulation and demodulation occurred inside computer subsystem 22, e.g., a laptop, tablet, personal computer, or similar type computer subsystem running operating system such as Linux or other computer operating system known by those skilled in the art connected to the SDRs 16 via Ethernet. Computer subsystem 22 also preferably performs dynamic calculations for signal cancellation. While the signal cancellation functions are useful, and enable full-duplex operation, they are not required for half-duplex LPI/LPD communication.

As shown in one or more of FIGS. 1-10, computer instructions which, when executed by one or more processors 24 on computer subsystem 22, FIG. 1, preferably perform the following:

1. Get next data symbol from Data To Transmit port (one bit for BPSK, two bits for QPSK, and the like).
2. Select phasor corresponding to the symbol (+/−1 for BPSK or one of $$\pm\sqrt{\frac{1}{2}} \pm \sqrt{\frac{-1}{2}}$$

for QPSK).
3. Read the realtime clock.
4. Select the Transmit Data Dictionary vector corresponding to the present time.
5. Select the Transmit Pilot Dictionary vector corresponding to the present time.
6. Multiply all elements of the data dictionary vector by the phasor selected in step 2.
7. Add vector created in previous step to pilot dictionary vector.
8. Buffer result to SDR for frequency conversion and analog streaming to power amplifier.

As shown in one or more of FIGS. 1-10, the computer instructions executed by one or more processors 24 preferably perform the following:

1. Get received vector from SDR receiver.
2. Read the realtime clock, determine equivalent transmission time for transmitting unit (our present time minus distance to transmitter divided by waveform propagation speed. Distance is usually known prior to deployment based on deployment information. The number of dictionary elements to be searched is proportional to distance knowledge uncertainty. Ultimately, one may know nothing of the distance, except that the stations are within some operational region.
3. Select the Receive Data Dictionary vector corresponding to transmission time.
4. Select the Receive Pilot Dictionary vector corresponding to transmission time.
5. Generate multiple copies of the Pilot vector corresponding to Doppler shifts expected. The range of Doppler shifts is dictated by the maximum relative speed between transmitter and receiver. The temporal scaling resolution is determined by the maximum delta-speed that will generate 90 degrees of phase shift over the duration of the Pilot vector.
6. Correlate each of these Doppler shifted pilot vectors against the received signal. Choose the Doppler shift that creates the largest single magnitude point in the correlation.

7. Use the selected Pilot dictionary and the received signal to generate an estimate of the impulse response between transmitter and receiver. This may be accomplished by using the selected Pilot dictionary to generate a Wiener filter. Alternative methods, such as Box-Jenkins, AR or ARMA may also be used. The impulse response may be smoothed by previous estimates, if desired.
8. Doppler shift the Receive Data Dictionary by the amount determined in step 6.
9. Convolve this Doppler shifted vector with the estimated channel impulse response.
10. Multiply this vector's elements by the received vector elements corresponding to arrival time found by the largest magnitude point in the correlation found in step 6.
11. Sum the result of the product of elements.
12. Measure the phase angle of this number, and choose the output symbol based on closeness of phase angle to the possible values (+/−1 for BPSK, $$\pm\sqrt{\frac{1}{2}} \pm \sqrt{\frac{-1}{2}}$$

for QPSK). Send symbol to Data Out.

That the cancellation signal path is not shown as it is not needed for half-duplex LPI/LPD systems and has been disclosed in Pat. Application No. WO 2016/205129 to Judell, incorporated by reference herein.

There may be situations where the ambient noise environment is not spectrally flat. In this case, the LPI/LPD signals discussed above may be input through a filter, e.g., linear time invariant invertible filter 110 discussed above with respect to one or more of FIGS. 6 and 7 such that the resulting transmitted spectrum is the same shape as the ambient noise spectrum. Because linear time invariant invertible filter 110 with inputs that are zero-mean Gaussian random samples produce zero-mean Gaussian random samples as their output, then this minimizes the probability of detection in non-white ambient noise environments. It is important to note that the filter phase response does not affect the result spectrum. It is therefore desirable to ensure that the output of linear time invariant invertible filler 110 can be inverted as discussed above. In the example of an analog filter, this means that all zeros of the filter must be in the left half of the Laplace plane.

One embodiment of system 10 and the method thereof shown in one or more of FIGS. 1-10 preferably uses a pilot channel and uses the pilot channel for channel estimation, Doppler estimation and compensation of the data channel. This is very helpful in shallow underwater acoustic systems, but not needed for most RF or deep-water acoustic systems. In those systems, the pilot channel can be omitted, and a standard CDMA receiver may be utilized, but with the receiver CDMA code being taken from the time-varying selection of the data dictionary, rather than from the normally fixed CDMA Gold or Kasami code.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A code division multiple access (CDMA) communications system with low probability of intercept, low probability of detect (LPI/LPD), the system comprising:
at least one data dictionary stored on a storage device of a sender subsystem and a recipient subsystem, the at least one data dictionary including at least one data predetermined start time and date, at least one data predetermined end time and date based on a mission length or a predetermined wrap time and date, a CDMA chip rate, and a complex zero-mean independent and identically distributed (iid) sequence where each complex number in the complex zero-mean iid sequence represents a CDMA chip stored on the storage device of the sender subsystem and the recipient subsystem;
at least one processor configured to:
receive a message,
convert the message to symbols with corresponding phasors,
determine a date and time to send the message,
look up a data spreading vector for each corresponding phasor by providing a mutually agreed number of chips per phasor stored on the storage device of the sender subsystem and the recipient subsystem and by matching the date and time the message is to be sent to the at least one data predetermined start time and date and the at least one data predetermined end time and date, and
multiply each data spreading vector by its corresponding phasor to create a data spread vector for each data spreading vector;
the sender subsystem configured to sequentially transmit each chip of each data spread vector as a signal; and
the recipient subsystem is configured to receive the signal from the sender subsystem and includes the mutually agreed number of chip sets per phasor and the data dictionary, the at least one processor further configured to generate an optimum multi-doppler correlation receiver.

2. The system of claim 1 in which the at least one data dictionary includes at least one Gaussian data dictionary.

3. The system of claim 2 further including a Gaussian pilot dictionary stored on the storage device of the sender subsystem and the recipient subsystem, the at least one pilot dictionary including at least one pilot predetermined start time and date and at least one pilot predetermined end time and date based on a mission length or a predetermined wrap time and date, a CDMA chip rate, and a Gaussian complex zero-mean iid sequence where each complex number in the complex zero-mean iid sequence represents a CDMA chip stored on the storage device of the sender subsystem and the recipient subsystem.

4. The system of claim 3 in which the at least one processor is further configured to look up a pilot spreading vector for each corresponding phasor by providing a mutually agreed number of chips per phasor stored on the storage device of the sender subsystem and the recipient subsystem and match the date and time the message is to be sent 5 to the at least one pilot predetermined start date and time and the at least one predetermined 6 pilot end time and date to create a pilot spread vector for each pilot spreading vector; combine each data spread data vector and each pilot spread vector; and the sender subsystem configured to transmit each chip of the combined data spread vector and the pilot spread pilot vector as a signal.

5. The system of claim 2 further including a linear time invariant invertible filter coupled to the sender subsystem configured to shape the spectrum of the transmitted signal to match the spectrum shape of a noise environment.

6. The system of claim 4 further including a linear time invariant invertible filter coupled to the sender subsystem configured to shape the spectrum of the transmitted signal to approximately match the spectrum shape of a noise environment.

7. The system of claim 4 further including a filter coupled to the recipient subsystem configured to invert the shape output by the linear time invariant invertible filter.

8. The system of claim 5 further including a filter coupled to the recipient subsystem configured to invert the shape output by the linear time invariant invertible filter.

9. The system of claim 4 in which the recipient subsystem is configured to receive the signal from the sender subsystem and includes the mutually agreed number of chip sets per phasor, the data dictionary, and the pilot dictionary, the processor further configured to generate an optimum multi-doppler correlation receiver.

10. The system of claim 7 in which the recipient subsystem is configured to receive the signal from the sender subsystem and includes the mutually agreed number of chip sets per phasor, the data dictionary, and the pilot dictionary, the processor further configured to generate an optimum multi-doppler correlation receiver.

11. The system of claim 8 in which the recipient subsystem is configured to receive the signal from the sender subsystem and includes the mutually agreed number of chip sets per phasor, the data dictionary, and the pilot dictionary, the processor further configured to generate an optimum multi-doppler correlation receiver.

12. A method for code division multiple access (CDMA) communication with low probability of intercept, low probability of detect (LPI/LPD), the method comprising:
storing at least one data dictionary including at least one data predetermined start time and date and at least one data predetermined end time and date based on a mission length or a predetermined wrap time and date, a CDMA chip rate, and a complex zero-mean independent and identically distributed (iid) sequence where each complex number in the complex zero-mean iid sequence represents a CDMA chip stored on a sender subsystem and a recipient subsystem;
receiving a message;
converting the message to symbols with corresponding phasors;
determining a date and time to send the message;
looking up a data spreading vector for each corresponding phasor by providing a mutually agreed number of chips per phasor stored on the sender subsystem and the recipient subsystem and by matching the date and time of the message is to be sent to the at least one data predetermined start time and date and the at least one data predetermined end time and date;
multiplying each data spreading vector by its corresponding phasor to create a data spread data vector for each data spreading vector;
sequentially transmitting each chip of each data spread vector as a signal; and
receiving the signal from the sender subsystem, providing the mutually agreed number of chip sets per phasor and the data dictionary, and generating an optimum multi-doppler correlation receiver.

13. The method of claim 12 in which the data dictionary includes at least one Gaussian data dictionary.

14. The method of claim 13 further including providing at least one Gaussian 2 pilot dictionary including at least one pilot predetermined start time and date and at least one pilot predetermined end time and date based on a mission length or a predetermined wrap time and date, a complex zero-mean iid sequence where each complex number and the complex zero-mean iid sequence represents a CDMA chip stored on the sender subsystem and the recipient subsystem;
looking up a pilot spreading vector for each corresponding phasor by providing a mutually agreed number of chips per phasor stored on the sender subsystem and the recipient subsystem and by matching the date and time the message is to be sent to the at least one pilot predetermined start time and date and the at least one pilot predetermined end time and date;
creating a pilot spread vector for each pilot spreading vector; and
combining each data spread vector and each pilot spread vector; and
transmitting each chip of the combined data spread vector and pilot spread vector as a signal.

15. The method of claim 12 further including providing a linear time invariant invertible filter coupled to the sender subsystem configured to shape the spectrum of the transmitted signal to match the spectrum shape of a noise environment.

16. The method of claim 14 further including providing a linear time invariant invertible filter coupled to the sender subsystem configured to shape the spectrum of the transmitted signal to match the spectrum shape of a noise environment.

17. The method of claim 15 further including inverting the shape output by the 2 linear time invariant invertible filter.

18. The method of claim 16 further including inverting the shape output by the linear time invariant invertible filter.

19. The method of claim 14 further including receiving the signal from the sender subsystem, providing the mutually agreed number of chip sets per phasor, the data dictionary, and the pilot dictionary and generating an optimum multi-doppler correlation receiver.

20. The method of claim 17 further including receiving the signal from the sender subsystem, providing the mutually agreed number of chip sets per phasor, the data dictionary, and the pilot dictionary and generating an optimum multi-doppler correlation receiver.

21. The method of claim 18 further including receiving the signal from the sender subsystem, providing the mutually agreed number of chip sets per phasor, the data dictionary, and the pilot dictionary and generating an optimum multi-doppler correlation 4 receiver.

\* \* \* \* \*